COLD ROLLING WORK ROLL

Original Filed Jan. 17, 1969 2 Sheets-Sheet 1

INVENTORS.
MAX E. BILLS AND
HENRY J. HANSEN, JR.
By Martin J. Carroll
Attorney

PRIOR ART

INVENTORS.
MAX E. BILLS AND
HENRY J. HANSEN, JR.
By Martin J. Carroll
Attorney

United States Patent Office

Re. 28,027
Reissued June 4, 1974

28,027
COLD ROLLING WORK ROLL

Max E. Bills, Pleasant Hills Borough, Pa., and Henry J. Hansen, Jr., Portage, Ind., assignors to United States Steel Corp.

Original No. 3,619,881, dated Nov. 16, 1971, Ser. No. 792,079, Jan. 17, 1969. Application for reissue Mar. 30, 1973, Ser. No. 346,554
Int. Cl. B21b *27/02*
U.S. Cl. 29—121 R 2 Claims

Matter enclosed in heavy brackets [ ] appears in the original patent but forms no part of this reissue specification; matter printed in italics indicates the additions made by reissue.

ABSTRACT OF THE DISCLOSURE

A work roll for cold rolling steel sheets or strip has a plurality of shallow generally frustospherical depressions in its outer surface. The vast majority of the depressions are of substantially uniform shape and depth, but may be randomly spaced over the roll surface. When the sheet is rolled between two rolls, at least one of which has the described surface, low generally frustospherical projections of substantially uniform shape and height are obtained on that side of the strip in contact with the surfaced roll.

This invention relates to a cold rolled sheet, to a method of making the same, and to a work roll for use in the method.

In the manufacture of cold rolled sheets it is necessary to control the surface finish of the produce to the required degree of roughness so as to enhance the appearance and the performance of the material in subsequent operations. The required finish is commonly obtained in the final stages of manufacture by rolling the strip between rolls of controlled roughness which impress such roughness generally into the surfaces of the strip. It is thus vitally important that these rolls possess the proper roughness. Conventionally, roll roughness is attained by carefully shot blasting the prepared roll surface, the depressions and associated peripheral upheaval thus created by particle impingement providing the desired roughness. This operation, however, is difficult to control because of differences in kinetic energy, size and angle of impingement of the shot blast particles. Thus, the resultant roll roughness pattern is characterized by randomness with respect to the shape, size and distribution of the topographical features. It is common practice for the customer to request a particular surface on the cold rolled strip, which is identified as so many microinches roughness as obtained by a standard profilometer measuring device. However, the reading obtained is such that it has relatively little relationship to the true type of surface. In other words, the same reading by the profilometer may result from surfaces having a substantial difference in appearance and/or a substantial difference in the shape and arrangement of the depressions. Since it is desirable that the surfaces of the strip have the same visual appearance and also that it have the same texture for receiving paint, it is clear that the process and the rolls now in use are not entirely satisfactory.

It is therefore an object of our invention to provide a cold rolled sheet having projections of such shape and arrangement that the visual appearance and surface of the sheet is relatively constant.

Another object is to provide an improved method of cold rolling a steel sheet to obtain a uniform, controllable, and reproducible surface thereon.

Still another object is to provide a work roll for use in the method of our invention.

These and other objects will be more apparent after referring to the following specification and attached drawings, in which.

Figure 1:
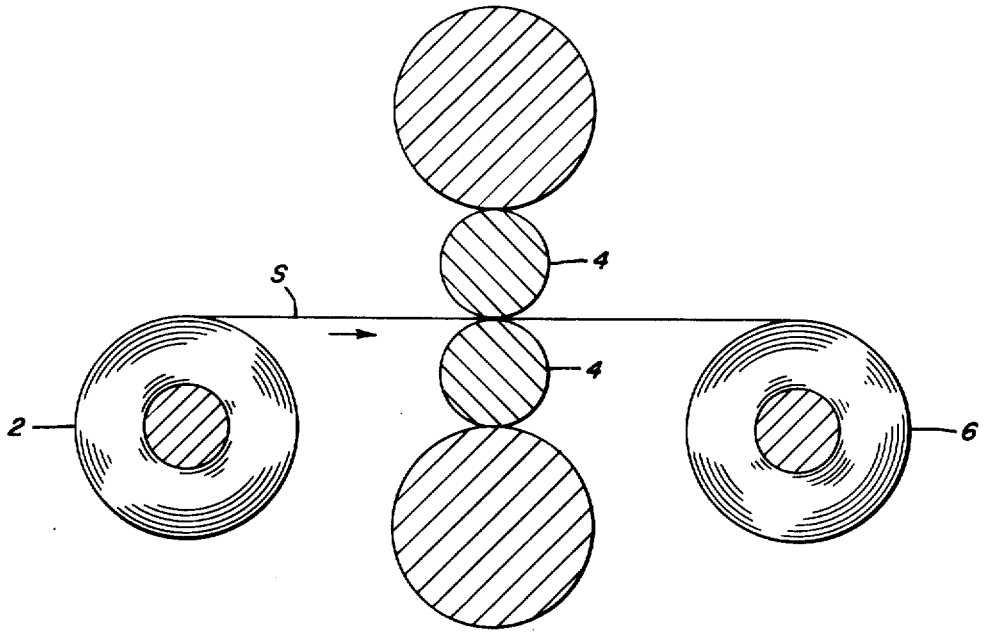
FIG. 1 is a view of a conventional temper rolling mill in which the rolls of our invention are principally used.
Figure 2:
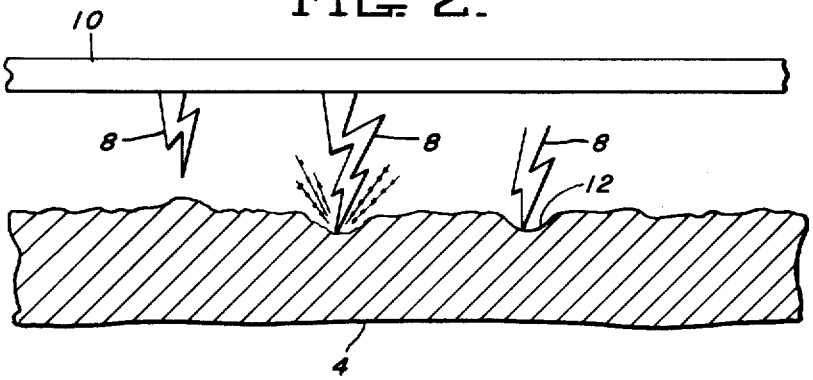
FIG. 2 is a schematic view showing depressions being generated in the surface of the roll according to our invention.

Referring more particularly to the drawings, reference numeral 2 indicates an uncoiler from which strip S is uncoiled and passes through a set of rolls 4 to a coiler 6. It will be understood that additional stands of rolls may be used at the entry side of rolls 4. However, the number of stands is not important insofar as our invention is concerned, it only being necessary that the strip have a relatively smooth surface prior to passing through the rolls 4. According to our invention the rolls 4 are textured or roughened by means of the well known Electric Discharge Machining (EDM) operation, in which bursts of electrical energy 8 from electrode 10 volatilize and remove small amounts of metal from the surface of the roll. This method generates shallow depressions 12 in the outer surface of the roll, thus providing the desired roughening of the roll surface. Most all of the depressions are of substantially uniform shape and depth, and, while closely spaced, are randomly spread over the outer surface of the roll. It will be seen that the depressions 12 are rounded and are substantially frustospherical. FIG. 2 shows only a few depressions 12 for the sake of clarity, but in the finished roll they will be very closely spaced.

The depth and diameter of the depressions 12 may vary over wide limits depending on the desired degree of roughening, this being a matter of selecting the proper electrical parameters for the individual electrical discharges so as to generate the desired degree of roughness in the roll surface. This procedure is well known and presents no problem to the operator. When the depth of the individual depressions is such as to provide an arithmetic average (AA) roughness in the roll surface of about 60 microinches, as measured with conventional profilometer measuring equipment, the individual depressions associated with such roughness vary approximately from .0005" to .001" in depth and from .010" to .020" in diameter. It will be understood that further variation will occur from these figures because the electrical discharges are compounded on one another and act in this manner to alter the dimensions of the individual roughness features. Despite such phenomena, however, the individual depressions are always rounded and of comparable depth for a given electrical setting of the EDM equipment, and it is from this characteristic that the unique features of the surface finish of our invention are derived. Sharp corners are essentially eliminated. The roughness may vary from approximately 20 to approximately 400 microinches, but in most cases will be between 20 and 80 microinches. Increasing the intensity or size of the electrical discharge increases the roughness and decreasing the intensity or size of the electrical discharges lowers the roughness of the roll surface.

Since the time required to texture rolls to the smoother finishes can become prolonged, it may be advisable in some instances to provide deeper depressions than desired and then brush or otherwise smooth the surface of the roll to obtain a smoother finish. Care must be taken not to substantially alter the shape or other essential characteristics of the EDM type finish.

Figure 3:
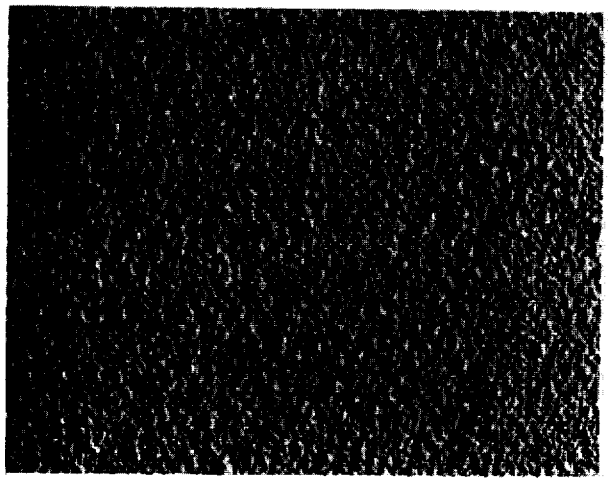
FIG. 3 is a magnified view of a replica of the roll surface resulting from our invention.
Figure 4:
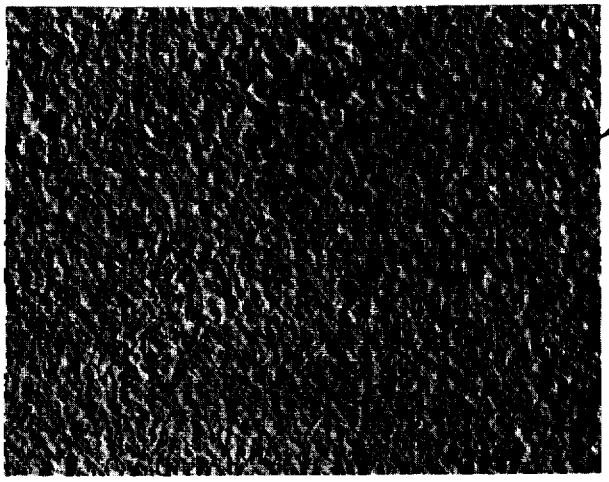
FIG. 4 is a magnified view of a replica of the roll surface resulting from shot blasting according to the prior art.

Since FIG. 3 is an enlarged photograph of a replica made of the surface of a work roll textured by Electric Discharge Machining methods, it represents the ideal strip surface finish obtainable when using our rolls. However, the work roll finish is superimposed to a degree over any other finish which the strip being rolled may possess, so that a perfect reproduction of the roll surface may not always be impressed into the steel surface. It is clear, however, that the EDM type of roll surface will generate a strip finish consisting of rounded topographical features of generally consistent shape and size. The regularity of shape and size of the topographical features of the EDM type surface shown in FIG. 3 are evident by contrast with the varying shape and size of the features of the shot blasted surface of FIG. 4.

While one embodiment of our invention has been shown and described, it will be apparent that other adaptations and modifications may be made without departing from the scope of the following claims.

We claim:

1. A *cyclindrical* [cold rolling] work roll [having a substantially cylindrical outer] *the circumferential* surface [with] *of which exhibits a texture characterized by* a plurality of closely spaced shallow *frusto-spherical* depressions [therein] *thereon*, substantially all of said depressions being of substantially uniform shape and depth, the arithmetic average roughness of [the cylindrical outer roll] *said* surface being substantially constant throughout and in the range between 20 and 400 microinches, *said surface having been textured to the desired arithmetic roughness by electrical discharge machining to remove metal therefrom and thereby form said frusto-spherical depressions.*

[2. A work roll according to claim 1 in which the depressions are generally frusto-spherical in shape.]

[3. A work roll according to claim 1 in which the depressions are formed by removing material from the roll.]

[4. A work roll according to claim 3 in which the depressions are generally frusto-spherical in shape.]

[5.] *2.* A work roll according to claim [4] *1* in which the average roughness of the cylindrical outer roll surface is in the range between 20 and 80 microinches.

References Cited

The following references, cited by the Examiner, are of record in the patented file of this patent or the original patent.

UNITED STATES PATENTS

| | | | |
|---|---|---|---|
| 2,765,682 | 10/1956 | Wiley | 29—121 R U X |
| 3,412,479 | 11/1968 | Markovic | 29—121 R X |

ALFRED R. GUEST, Primary Examiner